(12) United States Patent
Davies et al.

(10) Patent No.: US 9,938,905 B2
(45) Date of Patent: Apr. 10, 2018

(54) METHOD AND ARRANGEMENT FOR CONTROLLING FUEL SUPPLY FOR A GAS TURBINE

(71) Applicant: Siemens Aktiengesellschaft, Munich (DE)

(72) Inventors: Gareth Huw Davies, Coleby (GB); Michael Smith, North Hykeham (GB)

(73) Assignee: Siemens Aktiengesellschaft, Munich (DE)

(*) Notice: Subject to any disclaimer, the term of this patent is extended or adjusted under 35 U.S.C. 154(b) by 387 days.

(21) Appl. No.: 14/647,199

(22) PCT Filed: Nov. 5, 2013

(86) PCT No.: PCT/EP2013/073079
§ 371 (c)(1),
(2) Date: May 26, 2015

(87) PCT Pub. No.: WO2014/086540
PCT Pub. Date: Jun. 12, 2014

(65) Prior Publication Data
US 2015/0315978 A1    Nov. 5, 2015

(30) Foreign Application Priority Data
Dec. 3, 2012  (EP) .................................... 12195315

(51) Int. Cl.
*F02C 9/00* (2006.01)
*F02C 9/28* (2006.01)
(Continued)

(52) U.S. Cl.
CPC .................. *F02C 9/28* (2013.01); *F02C 9/32* (2013.01); *F02C 9/40* (2013.01); *F02C 9/48* (2013.01); *F05D 2260/80* (2013.01)

(58) Field of Classification Search
CPC ..................................... F02C 9/48; F02C 9/32
See application file for complete search history.

(56) References Cited

U.S. PATENT DOCUMENTS 6,082,092 A * 7/2000 Vandervort ............... F02C 9/28
                                                        60/39.281
6,490,867 B2  12/2002 Deuker
(Continued)

FOREIGN PATENT DOCUMENTS

CN       1971013 A     5/2007
CN     101079199 A    11/2007
(Continued)

OTHER PUBLICATIONS

RU Office Action dated Jun. 21, 2016, for RU application No. 2015126553.

*Primary Examiner* — Pascal M Bui Pho
*Assistant Examiner* — Katheryn Malatek
(74) *Attorney, Agent, or Firm* — Beusse Wolter Sanks & Maire (57) ABSTRACT

A method of controlling a supply of a fuel to a combustor of a gas turbine having a compressor upstream of the combustor is provided. The method includes: supplying the fuel to the combustor; obtaining a property value of at least one physical property (PT8, PT7, Tinlet, THBOV) of air used for burning the fuel in the combustor; estimating a heat input (HIengmodel) of the fuel supplied to the combustor based on the property value; measuring a Caloric Value (LCVmea) of the fuel upstream of the combustor; adjusting the estimated heat input (HIengmodel) based on the measured Caloric Value (LCVmea); and controlling a fuel valve regulating the supply of the fuel to the combustor based on the adjusted estimated heat input (HIexpected) and a demanded heat input (FFDEM).

19 Claims, 3 Drawing Sheets

(51) Int. Cl.
*F02C 9/32* (2006.01)
*F02C 9/40* (2006.01)
*F02C 9/48* (2006.01)

(56) References Cited

U.S. PATENT DOCUMENTS

| | | | |
|---|---|---|---|
| 7,424,823 B2 * | 9/2008 | Teolis | G01M 15/14 73/112.01 |
| 7,565,805 B2 | 7/2009 | Annigeri | |
| 7,756,626 B2 | 7/2010 | Fujii et al. | |
| 7,778,761 B2 | 8/2010 | Boeckhoff | |
| 7,823,562 B2 | 11/2010 | Duineveld | |
| 7,854,110 B2 | 12/2010 | Brahmasandra | |
| 7,950,216 B2 | 5/2011 | Brand | |
| 2006/0185367 A1 * | 8/2006 | Hino | F02C 7/14 60/772 |
| 2007/0203669 A1 | 8/2007 | Hayashi | |
| 2008/0071427 A1 | 3/2008 | Szepek et al. | |
| 2009/0071118 A1 | 3/2009 | Ma | |
| 2010/0173253 A1 | 7/2010 | Mohr et al. | |
| 2010/0275609 A1 | 11/2010 | Snider | |
| 2012/0036863 A1 * | 2/2012 | Kirzhner | F02C 7/22 60/776 |
| 2012/0079831 A1 | 4/2012 | Kirzhner et al. | |
| 2012/0102914 A1 * | 5/2012 | Kirzhner | F01D 17/08 60/39.281 |
| 2012/0287962 A1 * | 11/2012 | Ooishi | G01K 17/006 374/37 |

FOREIGN PATENT DOCUMENTS

| | | |
|---|---|---|
| CN | 101802369 A | 8/2010 |
| CN | 102562320 A | 7/2012 |
| EP | 0727574 B1 | 9/1998 |
| EP | 1788309 A2 | 5/2007 |
| EP | 2450551 A | 5/2012 |
| EP | 2450551 A2 | 5/2012 |
| JP | 2004190633 A | 7/2004 |
| RU | 2009137121 A | 4/2011 |
| RU | 2438027 C2 | 12/2011 |
| TW | 200905068 A | 2/2009 |

\* cited by examiner

METHOD AND ARRANGEMENT FOR CONTROLLING FUEL SUPPLY FOR A GAS TURBINE

CROSS REFERENCE TO RELATED APPLICATIONS

This application is the US National Stage of International Application No. PCT/EP2013/073079 filed Nov. 5, 2013, and claims the benefit thereof. The International Application claims the benefit of European Application No. EP12195315 filed Dec. 3, 2012. All of the applications are incorporated by reference herein in their entirety.

FIELD OF INVENTION

The present invention relates to a method and to an arrangement for controlling a supply of a fuel to a combustor of a gas turbine, wherein in particular a change in the type or kind or composition of the fuel is taken into account, while maintaining stable operation of the gas turbine.

ART BACKGROUND

US 2009/0071118 A1 discloses a method and a system for modulating the modified Wobbe index (MWI) of a fuel which is supplied to a gas turbine, wherein a heat exchanger is used to preheat the fuel and the MWI of the incoming fuel is monitored, wherein the MWI considers the temperature of the fuel.

US 2010/0275609 A1 discloses a hybrid Wobbe control during rapid response start-up, wherein a temperature of a fuel to be ignited within a combustor of a gas turbine is determined and an additive is introduced into the combustor of the gas turbine when the temperature of the fuel is less than the target temperature.

U.S. Pat. No. 6,490,867 B2 discloses a method of operating a burner and burner configuration, wherein a calorific value of the fuel is determined and the degree of opening of a control element is calculated and directly set using the output and the calorific value resulting in a variable output control that is operationally reliable with respect to perturbations.

Thereby, the calorific value of the fuel is determined from the mass flow and the calorific value of the water and the mass flow and the calorific value of the heating oil.

U.S. Pat. No. 7,854,110 B2 discloses an integrated fuel gas characterization system for determining the amount of energy provided by the fuel prior to combustion of the fuel in the combustion stage, wherein the integrated fuel gas characterization system can include a Wobbe Meter for measuring the Wobbe index of fuel gas before the fuel gas is combusted in the gas turbine and wherein the control system may be designed to adjust one or more operating parameters of the gas turbine engine based on the rate of change of the Wobbe index.

U.S. Pat. No. 7,950,216 B2 discloses a gas turbine engine fuel control system, wherein a controller calculates a desired flow rate based at least on the combustive energy value of the fuel which has been determined by a combustive energy value evaluator, wherein the energy value evaluator determines an energy value of the fuel mixture either directly by measurement or by reference to tables based on mixture ratios.

Thereby, the LHV of the fuel can be determined using the measured temperatures and air mass flow rates of the engine.

U.S. Pat. No. 7,565,805 B2 discloses a method for operating a gas turbine engine system, wherein a processor is programmed to receive a signal indicative of a heating value of the fuel and automatically controls a fuel split between the fuel injection points on the combustor using the determined heating value, wherein fuel nozzles are designed to operate within a limited range of pressure ratios and changes in heating value and fuel gas temperature are accommodated for by increasing or decreasing the fuel nozzle gas passage area. The modified Wobbe index (MWI) represents a measure of the energy injected into the combustor for a given upstream and downstream pressure across a given fuel nozzle gas orifice and is calculated using the fuel lower heating value, the specific gravity with respect to air and the fuel temperature. Further, automatically modulating fuel gas splits in combustor using measured or calculated fuel gas MWI is disclosed.

EP 2 450 551 A2 discloses systems and methods for compensating fuel composition variations in a gas turbine, the method including monitoring at least one fuel parameter associated with a turbine combustor; monitoring one or more combustion dynamics characteristics associated with the turbine combustor; monitoring one or more performance and emissions characteristics associated with the turbine; estimating fuel composition based at least in part on the at least one fuel parameter, the one or more combustion dynamics characteristics, and the one or more performance and emissions characteristics, and adjusting at least one fuel parameter based at least in part on the estimated fuel composition.

Calorimeters may have been used for monitoring fuel properties where gas fuel composition varies, but the slow update rates may have made it difficult to produce effective control loops which maintain stable engine operation. Limiting the allowable rate of change of the fuel properties may help to remedy this problem but this may be often an unacceptable constraint for a particular operation condition or user application. Further, determination of the fuel property purely based on estimation using an engine model may lack accuracy.

It has been observed that conventional methods for controlling a supply of a fuel to a combustor of a gas turbine may not in all circumstances or operating conditions address the issue for maintaining a desired operation of the gas turbine or a stable operation of the gas turbine, when the kind, type or composition of the supplied fuel changes. Further, it has been observed that calorimeter measurements of fuel properties may be too slow in situations of rapidly varying gas composition. Further, conventional methods for estimating of properties of the fuel from engine parameters has been observed to be fast but may be prone to inaccuracies and drift problems.

Thus, there may be a need for a method and for an arrangement for controlling a supply of a fuel to a combustor of a gas turbine, wherein situations in which fuel changes can be handled, in order to provide a stable operation of the gas turbine.

SUMMARY OF THE INVENTION

This need may be met by the subject matter according to the independent claims. Advantageous embodiments of the present invention are described by the dependent claims.

According to an embodiment of the present invention it is provided a method of controlling a supply of a fuel to a combustor of a gas turbine comprising a compressor upstream of the combustor, the method comprising: supplying the fuel to the combustor; obtaining a property value of at least one physical property of air used for burning the fuel in the combustor; estimating a heat input (e.g. HIengmodel) of the fuel (e.g. a fluid, in particular gas and/or liquid) supplied to the combustor based on the property value; measuring a Caloric Value of the fuel upstream of the combustor; adjusting the estimated heat input based on the measured Caloric Value to obtain an adjusted estimated heat input (HIestimated); and controlling a fuel valve regulating the supply of the fuel to the combustor based on the adjusted estimated heat input (HIexpected) and a demanded heat input (FFDEM), wherein an update interval of estimating the heat input is shorter than an update interval of measuring the Caloric Value.

Further, the adjusted estimated heat input may be compared with a demanded heat input (as provided from a gas turbine governor) to derive an heat input error value, wherein the heat input error value may be used to estimate a Wobbe index of the fuel which is then supplied to the fuel valve which may change its fuel flow setting to change a fuel flow rate, such as mass flow rate or volume flow rate. Further, the demanded heat input may be adjusted to maintain stable operation of the gas turbine.

In addition the method may comprise periodic measurement of the Lower Caloric Value (LCV), specific gravity (SG) and hence Wobbe Index (WI) of the fuel upstream of the combustor; comparing the estimated Wobbe index to the measured Wobbe index to create another error-term; and adjusting the estimated heat input flow based on this other error-term.

Heat Input to the engine may be measured in kW and may represent to amount of (chemical or combustion) energy comprised in the mixture of fuel and compressed air per time unit. The heat input may e.g. be defined by the LCV multiplied with a mass flow or volume flow.

The Lower Caloric Value LCV of the fuel is a, specific' quantity (per unit mass or unit volume of fuel) in kJ/kg or kJ/mA3. In the context of this document and the method the LCV may be volumetric, so is expressed in units of kJ/(normal_mA3) (normal mA3 being the volume of the gas at 0 degrees Celsius at ISO pressure), and Wobbe Index may be defined as volumetric LCV/root (SG).

In particular, one, two, three, five or even more property values of the respective number of physical properties of air may be obtained during the method and may be used to estimate the heat input. The property values may represent measured values or calculated or computed or derived values which may be based on other derived or measured quantities or values.

In particular, during performing the method, the kind, type or composition of the fuel may be unknown and may change in an unknown manner. Estimating the Caloric Value of the fuel may utilize an engine model, in particular comprising a thermodynamic model. The Caloric Value may in particular comprise a Lower Caloric Value.

The adjusting the estimated heat input based on the measured Caloric Value may represent a calibration of the estimated heat input, in order to adjust the absolute value of the estimated heat input.

Thereby, the use of engine characteristics to estimate the fuel heating value (or the heat input of the fuel) may be combined with a (periodic) cross reference to a measurement result of a fuel calorimeter, in order to maintain accuracy or to calibrate the estimated heat input. Thereby, the adjusted estimated heat input may to a higher accuracy correspond to or equal the actual heat input depending on the Caloric Value of the fuel. Thereby, this advantage may be provided by the combination of the purely estimated heat input and the measured Caloric Value, wherein measurements of the Caloric Value may be performed at a much slower rate than estimating the heat input. Thereby, the control method may allow faster controlling than using exclusively a calorimeter for determining a measured Caloric Value and may at the same time be more accurate than when using exclusively an estimated heat input.

Although the update interval of measuring the Caloric Value may be relatively long, nevertheless the adjusted estimated heat input may in an accurate manner reflect the actual Caloric Value or actual heat input, since the estimated heat input may be calibrated from time to time, in particular during stable operation, wherein neither the estimated heat input nor the measured Caloric Value change by more than predetermined thresholds, such as 10 of respective averages.

According to an embodiment of the present invention, the method further comprises comparing (e.g. comprising arithmetic/logic computing) the adjusted estimated heat input with a demanded heat input (FFDEM) to derive an error signal and controlling a fuel valve regulating the supply of the fuel to the combustor based on the error signal.

A controller may be provided which receives the error signal and which outputs a control signal aimed for reducing the error signal. In particular, the controller may output an estimated Wobbe index which may be supplied to the fuel valve which in turn may adjust its flow setting for changing the flow rate of the fuel, in order to reduce the error signal. Thereby, a stable operation of the gas turbine may be ensured, even if the type, the kind or the composition of the fuel changes during operation.

The controller may comprise an integrator with an appropriate gain to enable an error in heat input to be converted to an error in Wobbe Index for the purpose of adjusting the value of the estimated Wobbe Index in order to reduce the error signal.

According to an embodiment of the present invention, the adjusting the estimated heat input comprises calculation of a trimming factor from difference of estimated Wobbe index and measured Wobbe index, the estimated Wobbe index being derived by integrating the error signal, the measured Wobbe index being calculated from the measured Caloric Value (such as measured by a calorimeter) and a specific gravity of the fuel, wherein the adjusted estimated heat input is obtained by dividing the estimated heat input by the trimming factor.

From the estimated heat input an estimated Wobbe index may be derived.

The trimming factor may also be considered or referred to as a calibration factor in order to calibrate the estimated heat input or Wobbe index to an actual heat input or Wobbe index. The trimming factor may be stored in an electronic storage and may only be updated when the Caloric Value or Wobbe index is measured which may be less frequent than estimating the heat input or Wobbe index. The trimming factor may be derived in such a way that by dividing the estimated heat input by the trimming factor, the adjusted estimated heat input results in an estimated Wobbe Index which may more closely resemble the measured Wobbe Index.

Calculation of a trimming factor and applying the trimming factor to the estimated heat input or Wobbe index may simplify the method.

According to an embodiment of the present invention, the update interval of estimating the heat input is between 5 and 100 times as short as the update interval of measuring the Caloric Value.

The update interval of estimating the caloric value may for example be between 5 s and 1 min. The update interval of measuring the caloric value may be between 3 min and 30 min, for example.

According to an embodiment of the present invention, the adjusting the estimated heat input is performed, if the following criterion is satisfied: the estimated heat input is stable within +/−5%, in particular +/−2% within at least one update interval of measuring the Caloric Value and the measured Caloric Value is within a predetermined limit range.

The predetermined limit range of the measured Caloric Value may have been determined from expected compositions of the fuel or expected kinds or types of the fuel. Thereby, measurement outliers of the Caloric Value may not disturb the control method, since in this case the calibration of the estimated heat input or the adjusting the estimated heat input may be skipped e.g. and resumed e.g. in the next update interval.

Requiring that also the estimated heat input is stable within the defined limits may also indicate that the kind, the type or the composition of the fuel has changed since the last sample taken by the calorimeter and may thus improve the accuracy of the method by not making the adjustment during such changes.

According to an embodiment of the present invention, the criterion further comprises: the measured Caloric Value is stable within +/−5%, in particular +/−2% compared to the measured Caloric Value of the previous update interval.

The update interval for measuring the Caloric Value may for example amount to about 3 min or between 2 min and 30 min. When the measured Caloric Value is not stable within for example +/−5% it may indicate that the kind, the type or the composition of the fuel changes. In this situation a calibration of the estimated heat input is therefore not possible.

By avoiding this improper calibration, the control method may further be improved.

According to an embodiment of the present invention, the at least one physical property of air comprises an inlet air pressure (PT7) at a compressor inlet an inlet air temperature (Tinlet) at the compressor inlet and an outlet air pressure (PT8) at a compressor outlet.

Furthermore, the at least one physical property of air may further comprise a bleed valve setting, indicative of an amount of air not supplied to the combustor. Occurrence of bled air upstream of the combustor may also affect the estimation of the heat input of the fuel. Thus, taking into account the amount of air bled upstream of the combustor may improve the control method.

According to an embodiment of the present invention, estimating the heat input comprises forming a pressure ratio (PRC87) between the outlet air pressure (PT8) and the inlet air pressure (PT7) and estimating the heat input based on the pressure ratio.

The pressure ratio may be a suitable quantity in order to estimate the heat input. Thereby, the method may be simplified.

According to an embodiment of the present invention, estimating the heat input based on the pressure ratio comprises using at least one curve fit based on plural measurements performed on at least one gas turbines, the curve fit relating measured pressure ratio to measured heat input, wherein the curved fit is in particular described by a polynomial of second order having a positive first coefficient (a coefficient of the polynomial multiplied with the pressure ratio) and a positive second coefficient (a coefficient of the polynomial multiplied with the square of the pressure ratio), a representation of the curve fit being in particular stored in an electronic storage.

In particular, plural measurement points may be obtained from measurements performed on at least one gas turbine and the measurement points may be depicted in a graph having an abscissa denoting the pressure ratio and having an ordinate denoting the heat input or the heat input fuel flow in units Mega Watt (MW) or kilo Watt (kW), e.g. The at least one curve fit may be obtained by a least square fit of the measurement points to a polynomial, in particular to a polynomial of second order which describes the heat input fuel flow as the sum of a constant term, the first coefficient multiplied by the pressure ratio and the second coefficient multiplied with the square of the pressure ratio.

Using the experimental measurements may allow to derive a highly accurate relationship between the pressure ratio and the heat input from the fuel flow. Thereby, the method may be improved regarding accuracy of the estimated heat input.

According to an embodiment of the present invention, the at least one curve fit comprises: a first curve fit obtained based on measuring data, where no air was bled upstream of the combustor, a second curve fit obtained based on measuring data, where a portion, in particular between 5% and 15%, of air was bled upstream of the combustor, wherein based on the first curve fit a first heat input is derived and wherein based on the second curve fit a second heat input is derived, wherein based on the first heat input and the second heat input the estimated heat input is derived.

Considering the two cases where no air was bled upstream of the combustor and where a portion of the air was bled upstream of the combustor may lead to an improved accuracy of estimating the heat input. In particular, the first heat input and the second heat input correspond to the condition, where no air was bled upstream of the combustor and where a portion of the air was bled upstream of the combustor, respectively.

According to an embodiment of the present invention, the method further comprises: deriving a corrected heat input using a first function comprising the first heat input and the second heat input, if the pressure ratio exceeds a threshold, the threshold being in particular between 4 and 8, deriving the corrected heat input using a second function comprising at least the first heat input, if the pressure ratio does not exceed the threshold, wherein estimating the heat inputs is further based on the corrected heat input.

The first function may be a mathematical function for deriving the corrected heat input in dependence of the first heat input and the second heat input only in this case, when the pressure ratio fulfils the criterion to exceed the threshold. Further, the corrected heat input may be derived as a second mathematical function in dependence of only or at least the first heat input, if the pressure ratio does not satisfy the criterion, thus does not exceed the threshold.

Thereby, the influence of air bled off before the combustor may be taken into account more accurately. In particular, if the pressure ratio is above the threshold, an influence of bled air may be higher than if the pressure ratio does not exceed the threshold.

According to an embodiment of the present invention, the method further comprises estimating a portion of air bled upstream of the combustor based on a bleed valve setting, in particular using a bleed valve characteristic, wherein the first function comprises the estimated portion of bled air.

The bleed valve may comprise one or more valves arranged at different locations upstream of the combustor, or within the compressor section of the gas turbine. The bleed valve characteristics may be represented as a table, a graph, look-up table, or the like and may be stored in an electronic storage. The bleed valve characteristic may indicate that the flow of air is zero in a first valve angle range and it may indicate that the percent flow of the air increases linearly in a second valve angle range being adjacent to the first valve angle range. By using the bleed valve setting, determination of the amount of air which is bled off upstream of the combustor may be improved regarding accuracy.

According to an embodiment of the present invention, the method comprises calculating the estimated heat input from the corrected heat input, the inlet air pressure (PT7) and the inlet air temperature (Tinlet).

The estimated heat input may be derived using a mathematical formula, wherein in particular the corrected heat input is multiplied with the inlet air pressure and multiplied with the square root of a term comprising the inlet air temperature. Thereby, the estimated heat input may be calculated in an accurate way from the available input quantities.

According to an embodiment of the present invention, the method further comprises setting the valve to a flow rate of the fuel such that the error signal (defined above) is zero, the method afterwards comprising: supplying another fuel to the combustor, the other fuel being different from the fuel; obtaining another property value of the at least one physical property of air used for burning the other fuel in the combustor; estimating another heat input (HIengmodel) of the other fuel supplied to the combustor based on the other property value; measuring another Caloric Value of the other fuel upstream of the combustor; adjusting the other estimated heat input based on the other measured Caloric Value; and controlling the valve regulating the supply of the other fuel to the combustor based on the other adjusted estimated heat input (HIexpected) and the demanded heat input (FFDEM) such that the valve is set to another flow rate of the other fuel different from the flow rate of the fuel previously applied.

Thereby, a change of the type, the kind or the composition of the fuel can be accounted for while maintaining the stable operation of the gas turbine according to the demanded heat input, such as for example provided by a turbine governor.

It should be understood that features individually or in any combination disclosed, described or mentioned with respect to any method of controlling a supply of a fuel to a combustor of a gas turbine may also be applied individually or in any combination to an arrangement for controlling a supply of a fuel to a combustor of a gas turbine according to an embodiment of the present invention and vice versa.

According to an embodiment of the present invention, it is provided an arrangement for controlling a supply of a fuel to a combustor of a gas turbine comprising a compressor upstream of the combustor, the arrangement comprising: a fuel valve adapted to supply the fuel to the combustor; a processor adapted to obtain a property value of at least one physical property of air used for burning the fuel in the combustor; to estimate a heat input (HIengmodel) of the fuel supplied to the combustor based on the property value; to receive a measured Caloric Value or Wobbe index of the fuel upstream of the combustor; to adjust the estimated heat input based on the measured Caloric Value or Wobbe index; and to control the fuel valve regulating the supply of the fuel to the combustor based on the adjusted estimated heat input (HIexpected) and a demanded heat input (FFDEM), wherein an update interval of estimating the heat input is shorter than an update interval of measuring the Caloric Value.

According to another embodiment of the present invention, a gas turbine is provided comprising an arrangement for controlling a supply of a fuel to a combustor of the gas turbine as explained or described according to an embodiment above.

The engine calorimeter calculation may only be carried out, if the following "steady state" criterion is satisfied:

Record maximum and minimum values of Temperature control parameter e.g.Tfire (combustor outlet temperature equivalent to inlet temperature of burnt fuel to turbine section of gas turbine) over a rolling 5 minutes prior to current time.

Steady if Tfiremax−Tfiremin<Tss

Where Tss is a parameter initially set to 20° C.

The use of engine characteristics to estimate the fuel heating value may be combined with periodic cross reference to a fuel calorimeter in order to maintain accuracy according to an embodiment of the present invention. A trimming factor may be calculated from the difference between the engine characteristic method and the measured heating value and this may be applied to the calculated heat input from the engine model from which the fuel heating value (or caloric value) may be estimated. This cross reference may be only carried out in periods where the estimated heating value is stable, thus ensuring that the time delay of the calorimeter does not affect the results, and the trimming value may be applied over a moderate time period to ensure smooth alignment and stability of engine operation. Use of this method may maintain accuracy of the system without compromise from engine degradation.

DETAILED DESCRIPTION OF EMBODIMENTS

Figure 1:
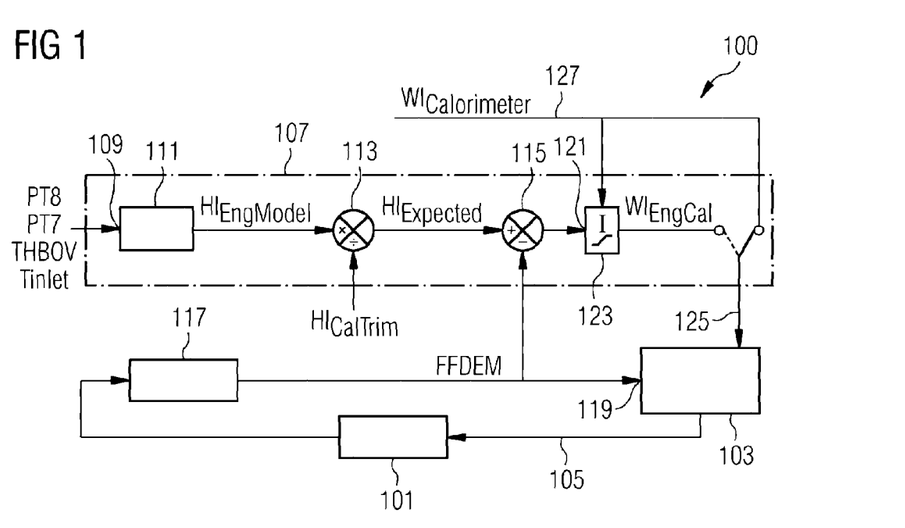
FIG. 1 schematically illustrates an arrangement for controlling a supply of a fuel to a combustor of a gas turbine according to an embodiment of the present invention which is adapted to perform a method of controlling a supply of a fuel to a combustor of a gas turbine according to an embodiment of the present invention.

FIG. 1 schematically illustrates an arrangement 100 for controlling a supply of a fuel to a combustor 101 of a gas turbine according to an embodiment of the present invention which is adapted to perform a method of controlling a supply of a fuel to a combustor of a gas turbine according to an embodiment of the present invention. The arrangement 100 comprises a fuel valve 103 adapted to supply a fuel 105 to a combustor 101 (of a gas turbine), wherein the fuel 105 is supplied via a fuel pipe. Further, the arrangement 100 comprises a processor 107 which is adapted to obtain an inlet air pressure PT7 which relates to a pressure of air at a compressor inlet, to obtain an inlet air temperature Tinlet which relates to a temperature of air at the compressor inlet, and to obtain an outlet air pressure PT8 which relates to a pressure of air at a compressor outlet. Thereby, the values of the inlet air pressure PT7, of the inlet air temperature Tinlet and the outlet air pressure PT8 may also be referred to as property values 109 of at least one physical property of air used for burning the fuel in the combustor.

The processor 107 is further adapted to obtain an air bleed signal THBOV, in particular a bleed valve setting or in particular a bleed valve angle, which is indicative of an amount of air not supplied to the combustor 101 comprised in the gas turbine. In other embodiments no bleeds are used and all air is supplied to the combustor. The property value 109 of the at least one physical property of air used for burning the fuel in the combustor comprises the aforementioned values of physical quantities. The property values 109 are supplied to an engine model 111 which is adapted to estimate a heat input HIengmodel of the fuel 105 supplied to the combustor 101 based on the property values 109 of at least one physical property of air.

The estimated heat input HIengmodel is supplied to an arithmetic element 113 which is provided to apply a trimming factor HIcaltrim to the estimated heat input HIengmodel according to a particular embodiment of the present invention, in which a calorimeter measurement for determining a measured Caloric Value or Wobbe Index is determined.

According to an alternative embodiment, the calorimeter measurement is not used in which case the trimming factor HIcaltrim is set to unity such that the adjusted estimated heat input HIexpected equals the estimated heat input HIengmodel according to this embodiment.

The adjusted estimated heat input HIexpected is supplied to an arithmetic addition element 115 which subtracts from the adjusted estimated heat input HIexpected a demanded heat input FFDEM which is demanded by an engine governor 117 which also supplies a corresponding control signal 119 to the fuel valve 103. In particular, the control signal 119 may represent the demanded heat input FFDEM generated by the engine governor 117.

The addition arithmetic element 115 outputs an error signal 121 which is thereby derived from the estimated heat input HIengmodel or the adjusted estimated heat input HIexpected and the demanded heat input FFDEM. The error signal 121 is supplied to an integration element 123 which may in general be embodied as a Pi-controller. The integration element 123 integrates the error signal 121 over time and outputs a mass specific heat input (in particular Wobbe index) WIengcal representing an estimated Wobbe index of the fuel, wherein the estimation uses the engine model 101 which will be described in more detail below. Via a control line 125, the derived mass specific heat input WIengcal is supplied to the fuel valve 103, based on which the fuel valve 103 adjusts the flow rate of the fuel 105 in order to minimize or eliminate the error signal 121.

According to an alternative embodiment of the present invention, additionally to estimating the Wobbe index WIe-ngcal using the engine model 101, a measured Caloric Value LCVmea is used to calculate a measured Wobbe index WIcalorimeter which is provided via a control line 127 and occasionally supplied to the fuel valve 103, in order to trim the estimated Wobbe index WIengcal. The calculation of the measured Wobbe index WIcalorimeter will be described with reference to FIG. 5 below.

Further, the measured Wobbe index WIcalorimeter is used in order to derive the trimming factor HIcaltrim which is supplied to the arithmetic element 113, in order to adjust the estimated heat input HIengmodel to derive an adjusted estimated heat input HIexpected, as will be described below with reference to FIG. 6.

Figure 2:
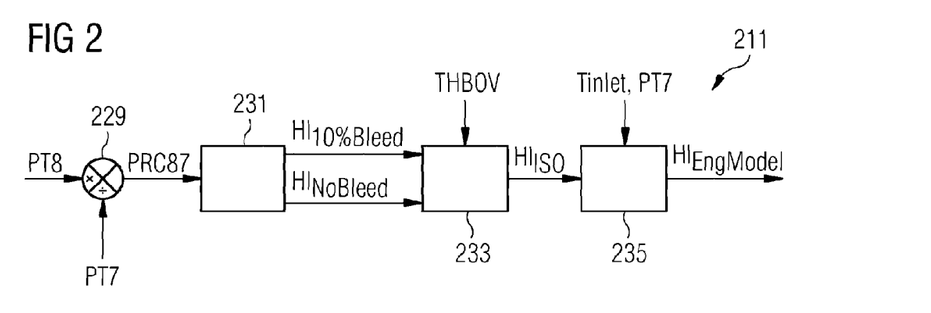
FIG. 2 schematically illustrates an engine model which is used in the arrangement illustrated in FIG. 1 and which is used in a method of controlling a supply of a fuel to a combustor according to an embodiment of the present invention.

FIG. 2 schematically illustrates an engine model 211 according to which the engine model 111 illustrated in FIG. 1 may be implemented according to an embodiment of the present invention.

An outlet air pressure PT8 representing a pressure of air at an outlet of the compressor is received by an arithmetic multiplication/division element 229. Further, the arithmetic multiplication/division element 229 receives as a divisor an inlet air pressure PT7 representing a pressure at a compressor inlet. The multiplication/division element 229 outputs a pressure ratio PRC87 (PT8/PT7) which is supplied to a heat input calculation element 231 which may also be referred to as HI-calculation element. Within the HI-calculation element 231, a first heat input HInoBLEED is calculated and further a second heat input HI10% BLEED is calculated. Thereby, the first heat input and the second heat input are calculated according to the following formulas:

Heat Input Calculation:
Calculate ISO-corrected heat input as function of pressure ratio, PRC87, for zero and 10% bleed:

$$HInoBLEED = a2*PRC87\char`\^2 + a1*PRC87 + a0$$

$$HI10\% \ BLEED = b2*PRC87\char`\^2 + b1*PRC87 + b0$$

The equations here are specific to a particular gas turbine. Other engines may use different coefficients and or different bleed fraction which may be determined by known methods.

These particular formulas have been derived based on plural measurements performed on at least one gas turbine which will be described in detail with reference to FIG. 3 below. The first heat input HInoBLEED and the second heat input HI10% BLEED are supplied to a bleed effect calculation block 233 which also receives an air bleed signal THBOV which is indicative of an amount of air not supplied to the combustor. The air bleed may be taken from the supply to the combustor, immediately upstream of the combustor, and from the same pressure chamber from which the outlet air pressure was derived or measured.

The bleed effect calculation block 233 takes into account if some of the compressed air is actually not supplied to the combustor. Thereby, the percentage of bleed is calculated according to the following formulas:

Calculate the % bleed (of engine inlet air mass flow), Bleed %, from THBOV, based on simplified valve characteristics:

if $THBOV <= 10$ Bleed %=0 if $THBOV > 10$ Bleed %=$(THBOV-10)/0.7$

These equations may be specific to the gas turbine in this example. Other engines may use different coefficients or form.

Furthermore, the bleed effect calculation block 233 calculates after estimating the percentage of bled air a corrected heat input HIiso from the first heat input and the second heat input using a first function or a second function depending on whether the pressure ratio PRC87 is larger than a threshold or not. The threshold may be chosen depending on the application and gas turbine and may be e.g. 6. Thereby, the calculation is performed according to the following formulas:

Calculate ISO corrected heat input by linearly interpolation if $PRC87>6$ HIiso=HIISOnoBleed+Bleed %/10*
(HIISO10% bleed-HIISOnoBleed)

if $PRC87<=6$ HIiso=HIISOnoBleed

The equations here may be specific to the gas turbine in the example. Other engines may use different equations or different coefficients.

The bleed effect calculation block 233 thereby outputs the corrected heat input HIiso and supplies it to an ambient correction element 235 which further receives the inlet air temperature Tinlet and furthermore the inlet air pressure PT7 which has already been supplied to the arithmetic element 229. The estimated heat input HIengmodel is thereby calculated by the ambient correction block 235 according to the following formula:

Calculate the current heat input from the ISO-corrected heat using the engine air inlet pressure PT7 [bar] and temperature Tinlet [degree Celsius]

HIEngModel=HIISO*$PT7$/1.01325*sqrt((Tinlet+273.15)/288.15)

The estimated heat input HIengmodel derived using the engine model 201 illustrated in FIG. 2 may for example be used within the arrangement 100 as the estimated heat input HIengmodel.

Figure 3:
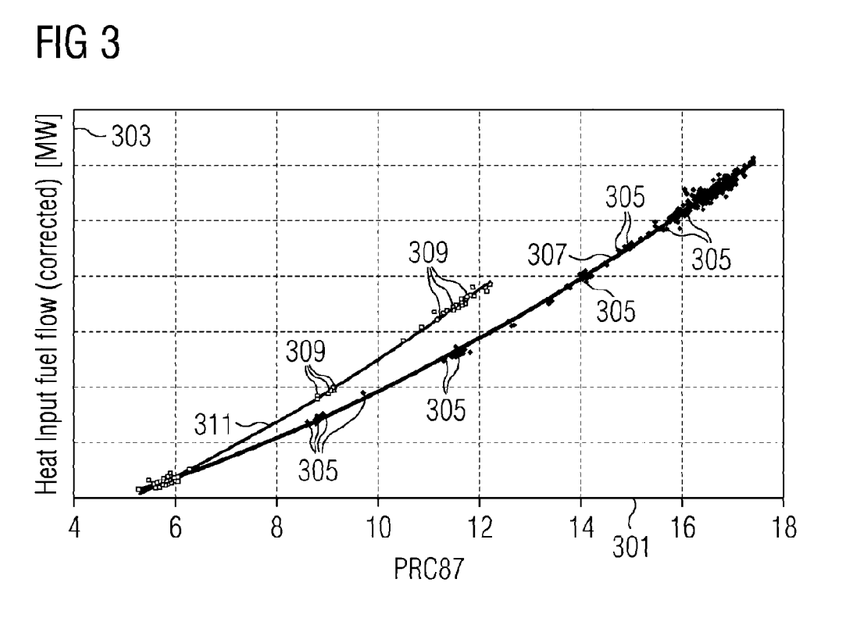
FIG. 3 schematically illustrates a graph for defining a heat input flow value to a gas turbine engine in dependence of a pressure ratio of air which may be used in a method and/or in an arrangement for controlling a supply of a fuel to a combustor according to an embodiment of the present invention.

FIG. 3 illustrates a graph for deriving two mathematical expressions for calculating the first heat input and the second heat input from the pressure ratio PRC87 which may be used according to an embodiment of the present invention.

On an abscissa 301, the pressure ratio PRC87, i.e. PT8/PT7, is indicated while on an ordinate 303, the heat input fuel flow in units Mega Watt (MW) representing the heat input of the fuel is indicated. The small diamonds 305 represent measurement points of the pressure ratio versus the heat input fuel flow performed at gas turbines of a type which is to be controlled by the control method, wherein no air was bled up-stream of the combustor. Applying a least square fit a polynomial of second order which is denoted by reference sign 307 was fit to the measurement data 305. The polynomial of second order in the pressure ratio PRC87 was used to calculate the first heat input in dependence of the pressure ratio PRC87.

The small squares 309 represent measurement points performed on gas turbines indicating the pressure ratio PRC87 versus the heat input fuel flow, wherein 10% of the air was bled off upstream of the combustor. A polynomial of second order 311 was fit using a least square procedure to the measurement data 309 and was used to derive the second heat input within the HI-calculation element 231 illustrated in FIG. 2.

Figure 4:
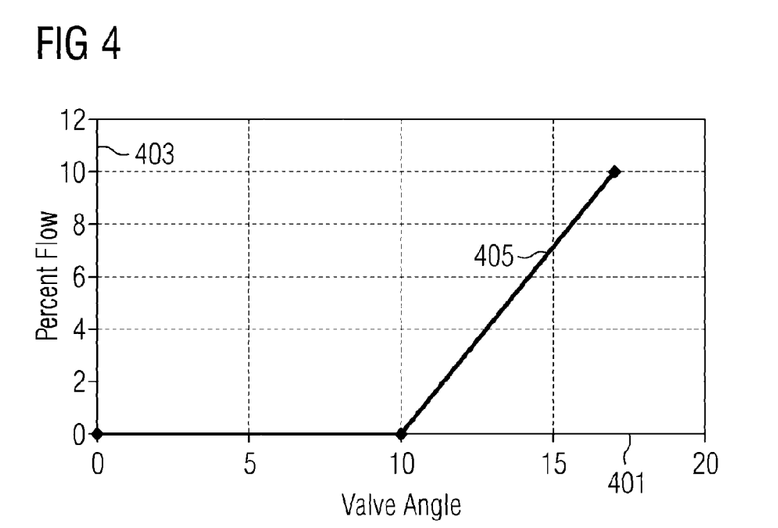
FIG. 4 illustrates a graph of a bleed valve characteristics for bleeding off air upstream of a combustor which relationship is used in an arrangement and/or in a method of controlling a supply of a fuel to a combustor according to an embodiment of the present invention.

FIG. 4 illustrates an exemplary graph of a bleed valve characteristics 405 specific for a particular valve which is used according to an embodiment of the present invention to estimate the percentage of bled air upstream of the combustor. On an abscissa 401, the air valve angle is indicated, while on an ordinate 403, the percent flow is indicated. The curve 405 indicates the dependency of the percent flow from the air valve angle. As can be taken from FIG. 4, the percent flow is 0 for an air valve angle between 0 and 10 and the percent flow increases in a linear manner in a range of the air valve angle between 10 and 17 from the percent flow of 0 to 10. Thereby, using the air valve angle, the percentage of bled air can be estimated according to an embodiment of the present invention, as is used in the bleed effect calculation element 233 in FIG. 2. Other valves may have a different characteristic.

Figure 5:
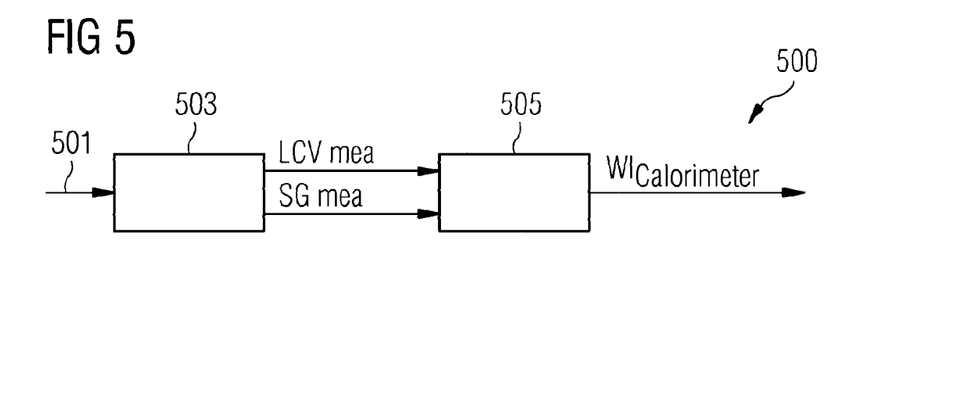
FIG. 5 schematically illustrates a calorimeter Wobbe index calculation scheme which may be utilized in an arrangement and/or in a method for controlling a supply of a fuel to a combustor of a gas turbine according to an embodiment of the present invention.

FIG. 5 schematically illustrates a calorimeter Wobbe index calculation procedure 500 which may be used in order to derive the measured Wobbe index WIcalorimeter which is used in the arrangement 100 illustrated in FIG. 1 as an input quantity via line 127. The calorimeter Wobbe index calculation scheme 500 illustrates a calorimeter which receives a sample 501 of fuel 105 which is supplied to the gas turbine 101. The sample of the same kind of fuel which is delivered to the gas turbine 101 may be taken from a supply pipe or supply pipe system which may be several metres, such as between 1 m and 20 m, upstream of the combustor. The sample 501 of the fuel 105 is burned under controlled conditions (such as standard conditions) within the calorimeter 503 and the generated heat is measured within the calorimeter 503. Further, the calorimeter 503 may have the capability to derive the specific gravity SG of the sample 501 of the fuel. From the generated heat due to the controlled combustion of the sample 501 of the fuel, the calorimeter 503 derives a Caloric Value, in particular the Lower Caloric Value LCV of the fuel. The thus measured Lower Caloric Value LCVmea as well as the specific gravity SGmea are supplied to a WI-calculation element 505 which calculates from the Lower Caloric Value LCVmea and the specific gravity SGmea the measured Wobbe index WIcalorimeter according to the following formula:

$$WI_{Calorimeter} = \frac{LCV}{\sqrt{SG}}$$

Calculation:

The same information may be provided from a Gas Chromatograph located identically as for the calorimeter, but which measures the composition of the gas sample and enables calculation of the LCV and SG of said sample.

The measured Wobbe index may then be supplied to the arrangement 100 for controlling a supply of a fuel to a combustor of a gas turbine 101 according to an embodiment of the present invention.

Figure 6:
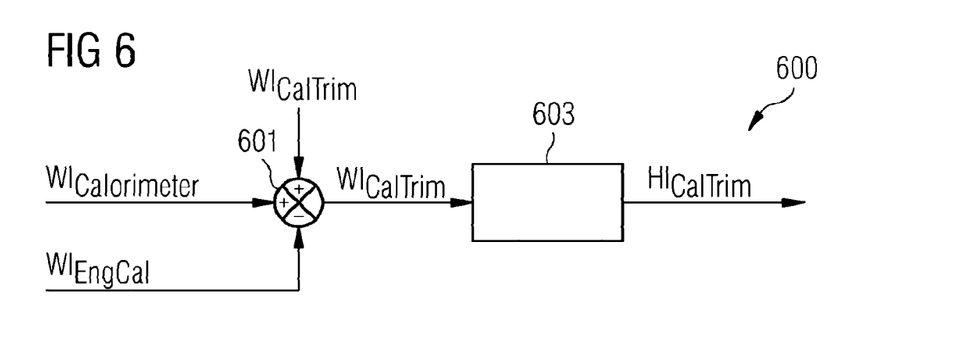
FIG. 6 schematically illustrates a calorimeter trimming factor calculation which may be utilized in a method and/or in an arrangement for controlling a supply of a fuel to a combustor of a gas turbine according to an embodiment of the present invention.

FIG. 6 illustrates a scheme 600 for determining a trimming factor HIcaltrim which may be used by the arrangement 100 illustrated in FIG. 1 as an input to the arithmetic element 113, in order to calculate an adjusted estimated heat input HIexpected from the estimated heat input HIengmodel.

According to the scheme 600, the measured Wobbe index (such as derived using the scheme 500 illustrated in FIG. 5) WI-calorimeter is received, following the analysis of each sample at intervals defined by the equipment in scheme 500, by an addition element 601. Further, the addition element 601 receives the estimated Wobbe index WIengcal which is for example output by the integration element 123 of the arrangement 100 illustrated in FIG. 1. The quantity WIcaltrim is set to the difference between the latest values of WIcalorimeter and WIengcal. The addition element 601 further receives the previous value of the quantity WIcaltrim for derivation of the new value of quantity WIcaltrim. The quantity WIcaltrim is supplied to a heat input trim calculation block 603 which derives the heat input trimming factor HIcaltrim according to the following formula:

HI Trim Calculation:

$$HI_{CalTrim} = 1 - \frac{WI_{CalTrim}}{WI_{Calorimeter}}$$

Embodiments of the control methods are further detailed below:

From the engine thermodynamic characteristics, using a simple model of heat input as a function of engine pressure ratio and bleed flow, the heat input supplied by the fuel may be estimated. Comparison of this value with the current control system demand heat input may indicate a difference in the fuel composition affecting WI. The difference may then be used to estimate a new value of WI. When used in parallel with a fuel calorimeter the estimation may also be trimmed to maintain accuracy, so that the changes in WI may be identified quickly but the absolute values remain based on the calorimeter.

The method may comprise the following inputs (not all need be mandatory):

demanded fuel heat input: FFDEM which is the fuel heat input (typically in kW) demanded by the engine governor for the fuel module to supply to the engine.

Operating temperature: e.g. Tfire (turbine inlet temperature at turbine section inlet being equivalent to combustor outlet temperature) from control system. This may be the control system temperature value equivalent to the combustor outlet temperature or the turbine inlet temperature ('TIT' or 'TET')

Compressor operating parameters:

Inlet Pressure from control system (PT7 in bar)

Outlet pressure from control system (PT8 in bar)

Inlet Temperature from control system (Tinlet degree Celsius)

Outlet Temperature from control system (TCD degree Celsius)

Bleed valve angle (may be e.g. an average of taken from 2 valves): From control system. Used for emissions control by means of extracting air before combustion to maintain combustor outlet temperature (THBOV)

LCV and SG: From Gas Chromatograph or calorimeter—update time of several minutes The following definitions/terminology may apply:

WICalorimeter: The value of Wobbe Index derived from the calorimeter or gas chromatograph measurements.

WIEngCal: The value of Wobbe Index estimated from the engine performance by the >engine calorimeter'

HIEngModel: The expected value of fuel supplied heat input required to run the engine at that operating condition, estimated directly from the engine characteristics model, HIExpected: The expected value of fuel supplied heat input required to run the engine at that operating condition, estimated from the engine characteristics model, but adjusted for engine degradation or aligned using fuel properties measurement from calorimeter or gas chromatograph.

HICalTrim: A trimming factor, derived from the calorimeter measurements or a degradation model, to be applied to the value of HIEngModel.

The calorimeter or gas chromatograph may output LCV and SG at each update time. These may be combined into a WI value (see FIG. 5). Fault detection is performed in that both the output values from the calorimeter should be monitored to ensure their values are within the range of expectation based on site fuel specification.

The Engine calorimeter Calculation may be performed as follows:

Before the engine is started the current value from the calorimeter may be fed to the fuel valve module as well as being used to initialise the integrator 123 within the 'engine calorimeter'. At this stage the engine model may not be used to estimate WI. On starting the engine and reaching minimum load the engine model operates, with an initial value of HICalTrim=1, and may provide estimates of heat input. These may be compared with the governor FFDEM in order to generate an error 121 which is then integrated out by changing the estimated WI (WIEngCal). This value may provided to the fuel module 103 instead of the direct calorimeter value, causing the FFDEM value from the governor 117 to change in order to maintain constant engine operation, thus eliminating the error term.

On starting the engine, if the fuel supply has changed but the supply pipes to the engine are full of the previous composition, then part way through the start the composition may change abruptly, potentially exceeding limits and causing a start fail. This situation may be rectified automatically on restart, provided that the calorimeter has provided an updated value. It may also be avoided by venting the supply lines before start. If the calorimeter is not available at the commencement of the start, the last value of WIEngCal may be used.

The engine calorimeter calculation may only be carried out, if the 'steady state' criterion below is satisfied:

Engine Steady State Criterion:

Record max and min values of temperature control parameter e.g. Tfire (turbine inlet temperature) over a rolling 5 minutes prior to current time.

Steady, if Tfiremax−Tfiremin<Tss

Where Tss is a parameter initially set to 20° C.

The calorimeter Trim Calculation may be performed as follows referring to FIG. 6:

This routine may run once on receipt of an update from the calorimeter provided that:

1/ WIEngCal has been stable for at least one calorimeter update interval (+/−

2/ (adjustable parameter in system)) AND WICalorimeter=previous value+/−2%

2/ Application of the previous update has been completed.

3/ calorimeter LCV and SG monitoring confirms that both values are within site defined limits.

80% (adjustable parameter) of the change in HICalTrim may be applied slowly, over 30 seconds (adjustable parameter). This may result in the method never using two successive calorimeter values unless the change is within the stability band.

The following assumptions may apply:

1/ The shape of new and clean engine characteristic is valid for all engine conditions.

2/ Engine is operating at approximately steady state (thermally).

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method of controlling a supply of a fuel to a combustor of a gas turbine comprising a compressor upstream of the combustor, the method comprising:
   supplying the fuel to the combustor;
   obtaining a property value of at least one physical property of air used for burning the fuel in the combustor;
   estimating an estimated heat input (HIengmodel) of the fuel supplied to the combustor based on the property value of the at least one physical property of air;
   measuring a measured Caloric Value (LCVmea) of the fuel upstream of the combustor;
   adjusting the estimated heat input (HIengmodel) based on the measured Caloric Value (LCVmea) to obtain an adjusted estimated heat input (HIexpected); and
   controlling a fuel valve regulating the supply of the fuel to the combustor based on the adjusted estimated heat input (HIexpected) and a demanded heat input (FFDEM),
   wherein an update interval of estimating the estimated heat input (HIengmodel) is shorter than an update interval of measuring the measured Caloric Value (LCVmea);
   wherein the at least one physical property of air comprises at least one of:
      an inlet air pressure (PT7) at a compressor inlet; a bleed valve setting (THBOV) indicative of an amount of air not supplied to the combustor;
      an inlet air temperature (Tinlet) at the compressor inlet; and
      an outlet air pressure (PT8) at a compressor outlet,
   wherein estimating the estimated heat input (HIengmodel) comprises:
      forming a pressure ratio (PRC87) between the outlet air pressure (PT8) and the inlet air pressure (PT7) and estimating the estimated heat input (HIengmodel) based on the pressure ratio (PRC87),
   wherein estimating the estimated heat input (HIengmodel) based on the pressure ratio (PRC87) comprises using at least one curve fit based on plural measurements performed on at least one another gas turbine of a same type as the gas turbine and the plural measurements are performed when a portion of the air is bled upstream of the combustor and when no air is bled upstream of the combustor, the at least one curve fit relating the pressure ratio (PRC87) to a measured heat input, and
   wherein the at least one curve fit is described by a polynomial of second order having a positive first coefficient and a positive second coefficient, and a representation of the at least one curve fit being stored in an electronic storage.

2. The method according to claim 1, further comprising:
   comparing the adjusted estimated heat input (HIexpected) with the demanded heat input (FFDEM) to derive an error signal; and
   controlling the fuel valve regulating the supply of the fuel to the combustor based on the error signal.

3. The method according to claim 1,
   wherein the adjusting of the estimated heat input (HIengmodel) comprises calculation of a trimming factor (HIcaltrim) calculated from a difference of an estimated Wobbe index (WIengcal) and a measured Wobbe index (WIcalorimeter), the estimated Wobbe index (WIengcal) being derived by integrating an error signal, the measured Wobbe index (WIcalorimeter) being calculated from the measured Caloric Value (LCVmea) and specific gravity (SGmea) of the fuel, and
   wherein the adjusted estimated heat input (HIexpected) is obtained by dividing the estimated heat input (HIengmodel) by the trimming factor (HIcaltrim).

4. The method according to claim 1,
   wherein the update interval of estimating the estimated heat input (HIengmodel) is between 5 and 100 times as short as the update interval of measuring the measured Caloric Value (LCVmea).

5. The method according to the claim 4, wherein the adjusting of the estimated heat input (HIengmodel) is performed, if the following criteria are satisfied:
   the estimated heat input (HIengmodel) remains within +/−5% of the estimated heat input (HIengmodel) of a previous update interval of measuring the measured caloric value (LCVmea), and
   the measured Caloric Value (LCVmea) remains within a predetermined limit range.

6. The method according to the claim 5, wherein the criteria further comprises: the measured Caloric Value (LCVmea) remains within +/−5% of the measured Caloric Value (LCVmea) of a previous update interval of measuring the measured caloric value (LCVmea).

7. The method according to claim 1, wherein the at least one curve fit comprises:
   a first curve fit obtained based on measuring data, where no air was bled upstream of the combustor, and
   a second curve fit obtained based on measuring data, where the portion of air was bled upstream of the combustor,
   wherein based on the first curve fit a first heat input (HIisonobleed) is derived and
   wherein based on the second curve fit a second heat input (Hiiso10%bleed) is derived, and
   wherein based on the first heat input (HIisonobleed) and the second heat input (Hiiso10%bleed) the estimated heat input (HIengmodel) is derived.

8. The method according to claim 7, further comprising:
   deriving a corrected heat input (HIiso) using a first function comprising the first heat input (HIisonobleed) and the second heat input (HIiso10%bleed), if the pressure ratio (PRC87) exceeds a threshold; and
   deriving the corrected heat input (HIiso) using a second function comprising at least the first heat input (HIisonobleed), if the pressure ratio (PRC87) does not exceed the threshold;
   wherein estimating the estimated heat input (HIengmodel) is further based on the corrected heat input (HIiso).

9. The method according to claim 8, further comprising estimating an estimated portion (bleed %) of air bled upstream of the combustor based on the bleed valve setting (THBOV), wherein the first function comprises the estimated portion (bleed %) of air bled upstream of the combustor.

10. The method according to claim 8, further comprising:
    calculating the estimated heat input (HIengmodel) from the corrected heat input (HIiso), the inlet air pressure (PT7) and the inlet air temperature (Tinlet).

11. The method according to claim 2, further comprising:
    wherein the fuel is a first fuel, the property value of the at least one physical property of air is a first property value of the at least one physical property of air, the estimated heat input is a first estimated heat input, the measured Caloric Value is a first measured Caloric Value, the adjusted estimated heat input is a first adjusted estimated heat input, the supply of the fuel to the combustor is a supply of the first fuel to the combustor;

setting the fuel valve to a flow rate of the first fuel such that the error signal is zero;

the method afterwards comprising:

supplying a supply of a second fuel to the combustor, the second fuel being different from the first fuel;

obtaining a second property value of the at least one physical property of air used for burning the second fuel in the combustor;

estimating a second estimated heat input of the second fuel supplied to the combustor based on the second property value of the at least one physical property of air;

measuring a second measured Caloric Value or a Wobbe index of the second fuel upstream of the combustor;

adjusting the second estimated heat input based on the second measured Caloric Value or the Wobbe index to obtain a second adjusted estimated heat input; and controlling the fuel valve regulating the supply of the second fuel to the combustor based on the second adjusted estimated heat input and the demanded heat input (FFDEM) such that the fuel valve is set to the supply of the second fuel to the combustor is different than the supply of the first fuel to the combustor.

12. An arrangement for controlling a supply of a fuel to a combustor of a gas turbine comprising a compressor upstream of the combustor, the arrangement comprising:

a fuel valve adapted to supply the fuel to the combustor; and a processor adapted to obtain a property value of at least one physical property of air used for burning the fuel in the combustor;

estimate an estimated heat input (HIengmodel) of the fuel supplied to the combustor based on the property value of the at least one physical property of air;

receive a measured Caloric Value (LCVmea) of the fuel upstream of the combustor;

adjust the estimated heat input (HIengmodel) based on the measured Caloric Value (LCVmea) or a Wobbe index to obtain an adjusted estimated heat input (HIexpected); and control the fuel valve regulating the supply of the fuel to the combustor based on the adjusted estimated heat input (HIexpected) and a demanded heat input (FFDEM), wherein an update interval of estimating the estimated heat input (HIengmodel) is shorter than an update interval of measuring the measured Caloric Value (LCVmea);

wherein the at least one physical property of air comprises at least one of:

an inlet air pressure (PT7) at a compressor inlet;

a bleed valve setting (THBOV) indicative of an amount of air not supplied to the combustor;

an inlet air temperature (Tinlet) at the compressor inlet; and an outlet air pressure (PT8) at a compressor outlet, wherein estimating the estimated heat input (HIengmodel) comprises:

forming a pressure ratio (PRC87) between the outlet air pressure (PT8) and the inlet air pressure (PT7) and estimating the estimated heat input (HIengmodel) based on the pressure ratio (PRC87), wherein estimating the estimated heat input (HIengmodel) based on the pressure ratio (PRC87) comprises using at least one curve fit based on plural measurements performed on at least one another gas turbine of a same type as the gas turbine and the plural measurements are performed when a portion of the air is bled upstream of the combustor and no air is bled upstream of the combustor, the at least one curve fit relating the pressure ratio (PRC87) to a measured heat input, and wherein the at least one curve fit is described by a polynomial of second order having a positive first coefficient and a positive second coefficient, and a representation of the at least one curve fit being stored in an electronic storage.

13. The method according to the claim 5, wherein the estimated heat input (HIengmodel) remains within 2% of the estimated heat input (HIengmodel) of a previous update interval of measuring the measured caloric value (LCVmea).

14. The method according to the claim 6, wherein the measured Caloric Value (LCVmea) remains within +/−2% of the measured Caloric Value (LCVmea) of a previous update interval of measuring the measured caloric value (LCVmea).

15. The method according to claim 7, wherein the portion of air bled upstream of the combustor is between 5% and 20% of an amount of air supplied to the combustor plus the amount of air not supplied to the combustor.

16. The method according to claim 8, wherein the threshold is between 4 and 8.

17. The method according to claim 9, wherein the bleed valve setting (THBOV) is estimated using a bleed valve characteristic.

18. The method of claim 1, wherein the polynomial comprises a sum of a constant term, a first coefficient multiplied by the pressure ratio (PRC87) and a second coefficient multiplied by a square of the pressure ratio (PRC87).

19. A method of controlling a supply of a fuel to a combustor of a gas turbine comprising a compressor up-stream of the combustor, the method comprising:

supplying the fuel to the combustor;

obtaining a property value of at least one physical property of air used for burning the fuel in the combustor;

estimating an estimated heat input (HIengmodel) of the fuel supplied to the combustor based on the property value of at least one physical property of air;

measuring a measured Caloric Value (LCVmea) of the fuel upstream of the combustor;

adjusting the estimated heat input (HIengmodel) based on the measured Caloric Value (LCVmea) to obtain an adjusted estimated heat input (HIexpected); and controlling a fuel valve regulating the supply of the fuel to the combustor based on the adjusted estimated heat input (HIexpected) and a demanded heat input (FFDEM), wherein an update interval of estimating the estimated heat input (HIengmodel) is shorter than an update interval of measuring the measured Caloric Value (LCVmea);

wherein the at least one physical property of air comprises at least one of an inlet air pressure (PT7) at a compressor inlet;

a bleed valve setting (THBOV) indicative of an amount of air not supplied to the combustor;

an inlet air temperature (Tinlet) at the compressor inlet; and an outlet air pressure (PT8) at a compressor outlet, wherein estimating the estimated heat input (HIengmodel) comprises:

forming a pressure ratio (PRC87) between the outlet air pressure (PT8) and the inlet air pressure (PT7) and estimating the estimated heat input (HIengmodel) based on the pressure ratio (PRC87), wherein estimating the estimated heat input (HIengmodel) based on the pressure ratio (PRC87) comprises using at least one curve fit based on plural measurements performed on at least one gas turbine of a same type as the gas turbine, the at least one curve fit relating the pressure ratio (PRC87) to a measured heat input, wherein the adjusting of the estimated heat input (HIengmodel) comprises calculation of a trimming factor (HIcaltrim) calculated from a difference of an estimated Wobbe index (WIengcal) and a measured Wobbe index (WIcalorimeter), the estimated Wobbe index (WIengcal) being derived by integrating an error signal, the measured Wobbe index (WIcalorimeter) being calculated from the measured Caloric Value (LCVmea) and specific gravity (SGmea) of the fuel, and wherein the adjusted estimated heat input (HIexpected) is obtained by dividing the estimated heat input (HIengmodel) by the trimming factor (HIcaltrim).

\* \* \* \* \*